United States Patent
Tasaki

(10) Patent No.: US 8,208,686 B2
(45) Date of Patent: Jun. 26, 2012

(54) OBJECT DETECTING APPARATUS AND METHOD FOR DETECTING AN OBJECT

(75) Inventor: Tsuyoshi Tasaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 723 days.

(21) Appl. No.: 12/379,784

(22) Filed: Feb. 27, 2009

(65) Prior Publication Data

US 2009/0238407 A1    Sep. 24, 2009

(30) Foreign Application Priority Data

Mar. 21, 2008 (JP) ................. P2008-074462

(51) Int. Cl.
*G06K 9/00* (2006.01)

(52) U.S. Cl. ........................................ 382/103

(58) Field of Classification Search .......... 382/100–107; 348/113, 154–157, 169–175; 340/907–911, 340/933–940; 73/488–491
See application file for complete search history.

(56) References Cited

FOREIGN PATENT DOCUMENTS

JP        2006-268076        10/2006

*Primary Examiner* — Atiba O Fitzpatrick
(74) *Attorney, Agent, or Firm* — Nixon & Vanderhye, P.C.

(57) ABSTRACT

An apparatus for detecting an object, includes: a candidate point detection unit detecting a candidate point between the ground and an object from an image; a tracking unit calculating positions of the candidate point at a first time and a second time; a difference calculation unit calculating a difference between an estimated position at the second time and the candidate point position at the second time; and a state determination unit determining a new state of the candidate point at the second time based on the difference, and changing the search threshold value or a state.

20 Claims, 10 Drawing Sheets

OBJECT DETECTING APPARATUS AND METHOD FOR DETECTING AN OBJECT

CROSS REFERENCE TO RELATED APPLICATIONS AND INCORPORATED BY REFERENCE

The application is based upon and claims the benefit of priority from the prior Japanese Patent Applications No. P2008-074462, filed on Mar. 21, 2008; the entire contents of which are incorporated herein by reference.

BACKGROUND OF THE INVENTION

1. Field of the Invention

The present invention relates to an object detection apparatus and an object detection method for detecting an object.

2. Description of the Related Art

For a moving vehicle such as a robot, in order to ensure safe movement, it is important to detect an ambient object (obstacle) and to perform an avoidance maneuver corresponding to whether the detected object is a moving object or a static object. In this connection, heretofore, a method for detecting an object has been developed. In this method, a current image is estimated from a past (prior) image by using movement information of the moving vehicle and a distance measuring sensor, and a difference between the estimated image and the current image is determined. However, a sensor for measuring a distance to the object in the image is necessary in order to create the estimated image of the entire image.

As a method that does not use the sensor for measuring the distance, JP-A 2006-268076 (KOKAI) discloses a bird's eye image is created from which only a distance from a camera image to the ground can be measured accurately. An image conversion is performed so that a roadside line on a past bird's eye image coincides with a roadside line on a current bird's eye image. Then, an inconsistent point between the roadside lines is detected as the object. However, in JP-A 2006-268076, the method does not determine whether the roadside line is actually a line on a road surface or not. Moreover, it is premised that the roadside lines correspond to each other between the current and past images, and this method cannot be used in the case where many moving objects exist on the road surface. Furthermore, even in the case where the number of moving objects is small, virtual images are formed at positions where the moving objects existed in the past since each difference is taken in the entire image. This may cause a malfunction, and in addition, a moving object and a static object cannot be identified from each other.

As described above it has been difficult to detect accurately an object without a sensor for measuring a distance.

SUMMARY OF THE INVENTION

An object of the present invention is to provide an object detection apparatus and a method for detecting an object, which can accurately detect an object without a sensor for measuring a distance.

An aspect of the present invention inheres in apparatus for detecting an object, including: a candidate point detection unit configured to detect a candidate point of a contact point between the ground and an object located on the ground from pixels in an image of the object taken by an imaging device; a search threshold value storage unit configured to store a search threshold value for use in detecting the candidate point; a tracking unit configured to track positions of the candidate point, and calculate the positions of the candidate point at a first time and a second time, respectively; a difference calculation unit configured to calculate a difference between an estimated position of the candidate point at the second time, the estimated position is estimated based on the position of the candidate point at the first time, and the position of the candidate point at the second time; a candidate point state storage unit configured to store a state of the candidate point; and a state determination unit configured to determine a new state of the candidate point at the second time based on the difference, and change the search threshold value stored in the search threshold value storage unit or the state stored in the candidate point state storage unit, in accordance with the new state.

Another aspect of the present invention inheres in method for detecting an object, including: reading a search threshold value from a search threshold value storage unit, and detecting a candidate point of a contact point between the ground and an boundary of an object located on the ground from pixels in an image of the object taken by an imaging device; tracking a position of the candidate point, and calculating the positions at a first time and a second time, respectively; calculating a difference between an estimated position at the second time, the estimated position is estimated based on the position of the candidate point at the first time, and the position of the candidate point at the second time; determining a new state of the candidate point at the second time based on the difference; and changing the search threshold value stored in the search threshold value storage unit or a state of the candidate point preliminary stored in a candidate point state storage unit, in accordance with the new state.

DETAILED DESCRIPTION OF THE INVENTION

Figure 1:
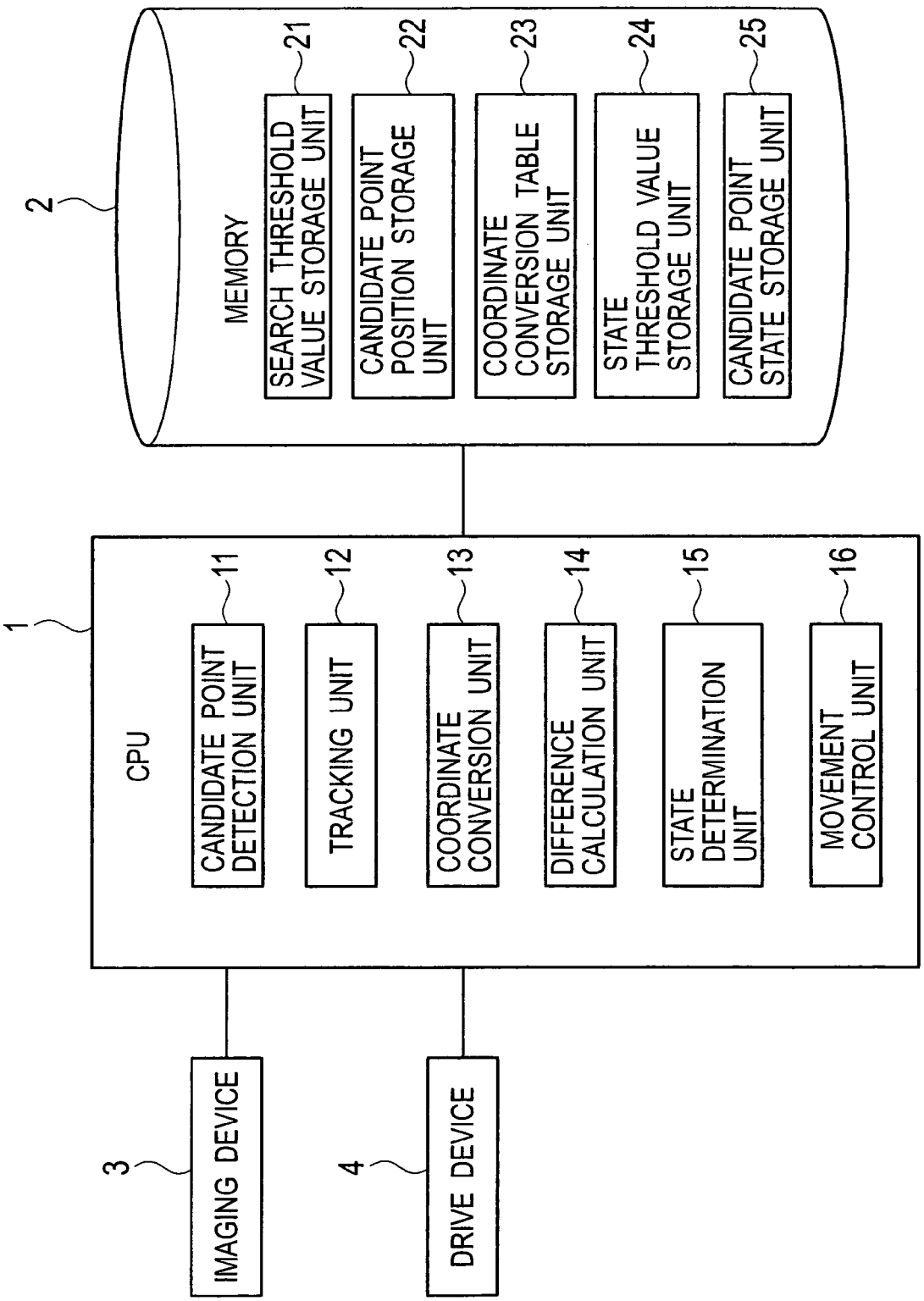
FIG. 1 is a block diagram showing an example of an object detection apparatus according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as it is conventional in the representation of semiconductor devices, it will be appreciated that the various drawings are not drawn to scale from one figure to another nor inside a given figure, and in particular that the layer thicknesses are arbitrarily drawn for facilitating the reading of the drawings.

In the following descriptions, numerous specific details are set fourth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

(Object Detection Apparatus)

As shown in FIG. 1, an object detection apparatus according to an embodiment of the present invention includes a central processing unit (CPU) 1; a memory 2 that stores a program necessary for an operation of the CPU 1, data necessary for an arithmetic operation of the CPU 1, and the like; an imaging device 3 that is mounted on a moving vehicle such as a robot to create an image; and a drive device 4, such as a motor, configured to moves the moving vehicle.

In the object detection apparatus according to the embodiment of the present invention, a description is given of the use of a wide angle camera having a curved surface mirror mounted thereon as the image device 3; however, the imaging device 3 may be provided by using a general camera that takes undistorted the image. In the following, a description of processing is appropriately added in which a method is different from that in the case of using a general camera.

Figure 2:
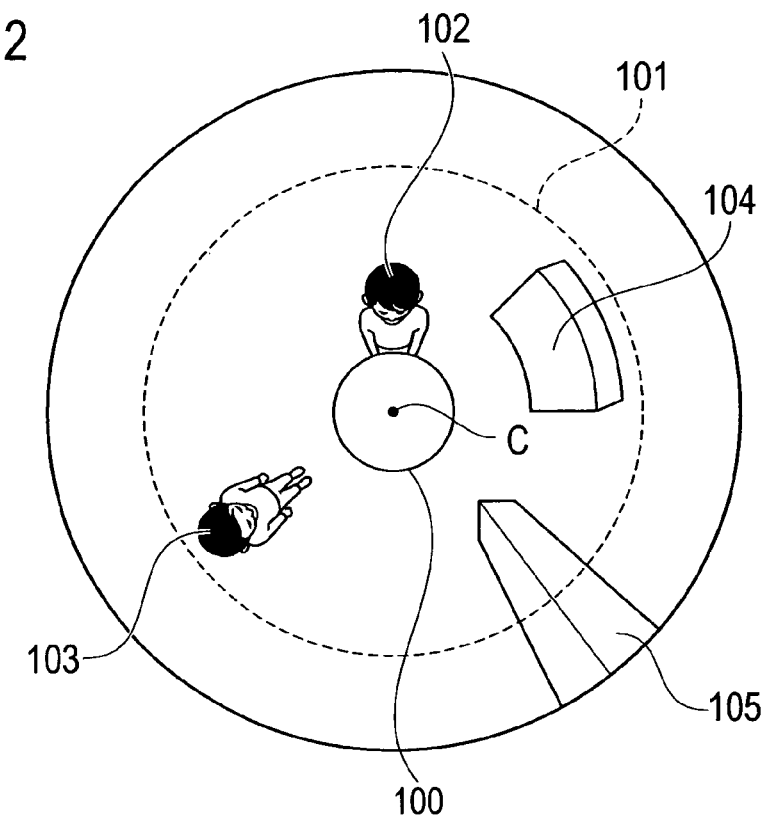
FIG. 2 is a schematic view showing an example of an image imaged by an imaging device according to the embodiment of the present invention.

FIG. 2 shows an example of the image taken by the imaging device 3. People 102 and 103 are moving objects, and a desk 104 and a pillar 105 are static objects. A region 100 around a center C of the image is a pixel region in which the pixels do not show a point on the floor. Such point can be seen in a wide angle image imaged by using a mirror. A bird's eye image region 101 extends from the center C to the horizon. This region is preset based on characteristics of a body and lens of the imaging device 3.

The CPU 1 shown in FIG. 1 logically includes modules (logic circuits) as hardware resources. The modules include a candidate point detection unit 11 that detects a candidate point of a contact point (floor side point) between the ground (floor) and an object disposed on the ground from the pixels contained in the image taken by the imaging device 3; a tracking unit 12 that tracks positions of the detected candidate point on the image in a time sequence, and calculates positions of the candidate points on the image at a first time and a second time; a coordinate conversion unit 13 that performs coordinate conversion for the positions of the candidate points on the image at the first and second times, individually, into two-dimensional coordinates in which the candidate points are estimated to be located at a height of the ground (floor); a difference calculation unit 14 that calculates a difference between an estimated position at the second time, which is estimated from a position of the candidate point on a camera coordinate at the first time, that is subjected to the coordinate conversion, and a position of the candidate point on the camera coordinate at the second time; and a state determination unit 15 that determines a new state of the candidate point at the second time based on the difference, and changes, in response to the state of the new candidate point, a search threshold value for use in detecting the candidate point, which is stored in a search threshold value storage unit 21 of the memory 2, or a state stored in a candidate point state storage unit 25 of the memory 2. The CPU 1 further logically includes, as a hardware resource module (logic circuit), a movement control unit 16 that outputs a signal for driving the drive device 4 and controlling the movement of the moving vehicle. An input unit, an output device and the like may be connected to the CPU 1 according to needs.

Herein, the phrase "position on an image" refers to a position in the image imaged (taken) by the imaging device 3, that is, coordinates of a pixel. The phrase "position on camera" coordinates refers to coordinates on a virtual space, which are used by the object detection apparatus in order to estimate a horizontal position of an object in a real space from the image. The position on camera, for example, refers to coordinates obtained after performing coordinate conversion for the position on the image.

The candidate point detection unit 11 reads a search threshold value $\delta_\theta$ from the search threshold value storage unit 21 of the memory 2, and in the image imaged (taken) by the imaging device 3, detects a position of a candidate point P$\theta$ of a contact point between the ground and an object boundary in an on-image direction $\theta$ designated from the state determination unit 15. The direction $\theta$ is defined at a constant interval. Here, a description is given of the case of setting the direction $\theta$ at 1 degree, 2 degrees . . . , and 360 degrees and detecting 360 candidate points for each one degree; however, the number of candidate points may be changed according to applications.

Figure 3:
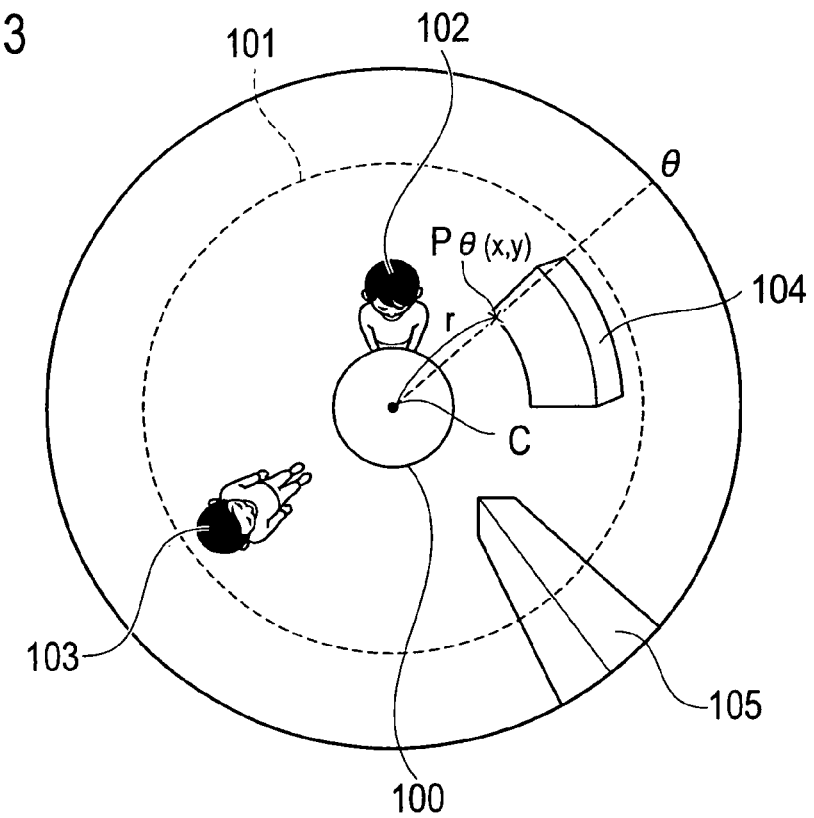
FIG. 3 is a schematic view for explaining a method for detecting a candidate point in an image imaged by the imaging device according to the embodiment of the present invention.

As shown in FIG. 3, while obtaining brightness differences of a pixel in the search direction from other pixels toward distant points from a center C on the image while excluding the region 100 from a search range, the candidate point detection unit 11 is extended a distance r by every fixed number of pixels until an expression (1) is not satisfied.

$$|I(r+1,\theta)-I(r,\theta)|<\delta_\theta \tag{1}$$

Here, I (r, $\theta$) denotes a pixel value (brightness) of coordinates (r cos $\theta$, r sin $\theta$) in an image coordinate system using, as an origin, an position on the image where the imaging device 3 is positioned. Then, a pixel located at the distance r when the expression (1) is not satisfied the first time is set as the candidate point P$\theta$. The position (x, y) of the candidate point P$\theta$ is calculated as in the expression (2) by using the distance r.

$$x=r\cos\theta, y=r\sin\theta \tag{2}$$

Note that, in the case of using a general camera, similar processing needs to be performed after calculating the direction $\theta$ by using a parameter calibrated in advance.

Although the candidate point is detected by using the difference between the pixel values (brightness) in the above, such a detection method of the candidate point is not particularly limited, and just needs to be a method for detecting the candidate point by using a threshold value.

The direction θ is not designated by the state determination unit 15 when an initial image is obtained at the time of system activation. Accordingly, the candidate point detection unit 11 detects the candidate points by using the fixed search threshold values $\delta_\theta$ for all directions where the imaging device 3 has a possibility to advance. The candidate point detection unit 11 registers positions of the respective detected candidate points in a candidate point position storage unit 22 of the memory 2. The candidate point detection unit 11 also registers states of the respective candidate points as "still undeterminable points (hereinafter, these states are referred to as "NEW")" in the candidate point state storage unit 25 of the memory 2 together with IDs for associating the states concerned with the positions of the candidate points registered in the candidate point position storage unit 22.

For example, the Lucas-Kanade algorithm can be used so that the tracking unit 12 tracks the positions of the candidate points detected by the candidate point detection unit 11 in a time sequence. Then, the tracking unit 12 calculates positions of candidate points on the image at a first time (past) and a second time (current), which are acquired by the imaging device 3. Then, the tracking unit 12 registers the positions of the candidate points on the image in the candidate point position storage unit 22. Note that the first time and the second time are arbitrary times. By using a coordinate conversion table stored in a coordinate conversion table storage unit 23 of the memory 2, the coordinate conversion unit 13 performs the coordinate conversion for the positions of the respective candidate points on the image at the first time, and stores the point positions in the candidate point position storage unit 22, and the positions of the respective candidate points on the image at the second time into two-dimensional coordinates (camera coordinate systems using, as the origin, the position where the imaging device 3 is placed) while estimating that the candidate points are located at the height of the ground.

The coordinate conversion table shows a correspondence relationship between coordinates on the image and coordinates of the camera coordinate systems. The coordinate conversion table is created by calibrating the imaging device 3 in advance and using expressions (3) and (4).

$$x = \frac{Xf(b^2 - c^2)}{(b^2 + c^2)(Z - c) - 2bc\sqrt{X^2 + Y^2 + (Z - c)^2}} \quad (3)$$

$$y = \frac{Yf(b^2 - c^2)}{(b^2 + c^2)(Z - c) - 2bc\sqrt{X^2 + Y^2 + (Z - c)^2}} \quad (4)$$

Figure 4:
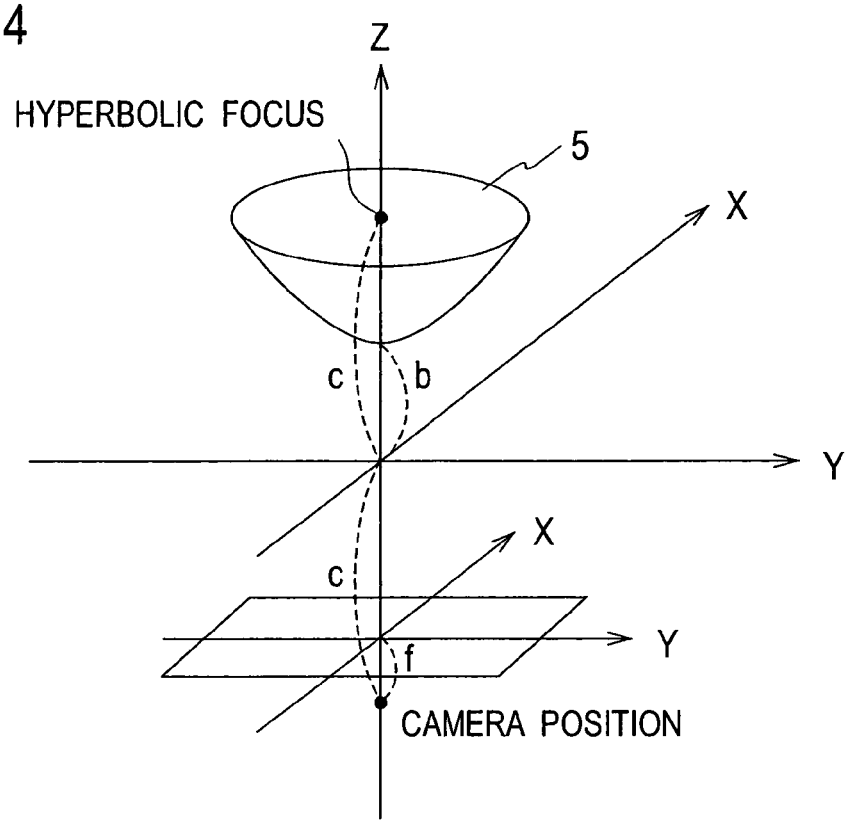
FIG. 4 is a schematic view for explaining a method for converting a coordinate of the candidate point according to the embodiment of the present invention.

Here, as shown in FIG. 4, symbol X denotes an X-coordinate (camera coordinate) of an imaged subject in the real world (three-dimensional), symbol Y denotes a Y-coordinate (camera coordinate) of the imaged subject in the real world (three-dimensional), and symbol Z denotes a Z-coordinate (camera coordinate) of the imaged subject in the real world (three-dimensional). Symbol f denotes a focal distance of the lens. Symbols b and c denote parameters individually decided based on a shape of a curved surface mirror 5. Symbol x denotes an x-coordinate (image coordinate) of the imaged subject on the obtained image, and symbol y denotes a y-coordinate (image coordinate) of the imaged subject on the obtained image. Symbol Z denotes a height at which the camera is placed. Accordingly, the symbol Z is defined to be already known.

Note that, in the case of using the general camera, a conversion table may be created in a similar way, for example, by using an expression of perspective projection.

For candidate points which exist outside of the region created by the bird's eye image 101, the coordinate conversion unit 13 cannot perform the coordinate conversion. Accordingly, the coordinate conversion unit 13 outputs "FALSE" as a result of performing the coordinate conversion.

Figure 5:
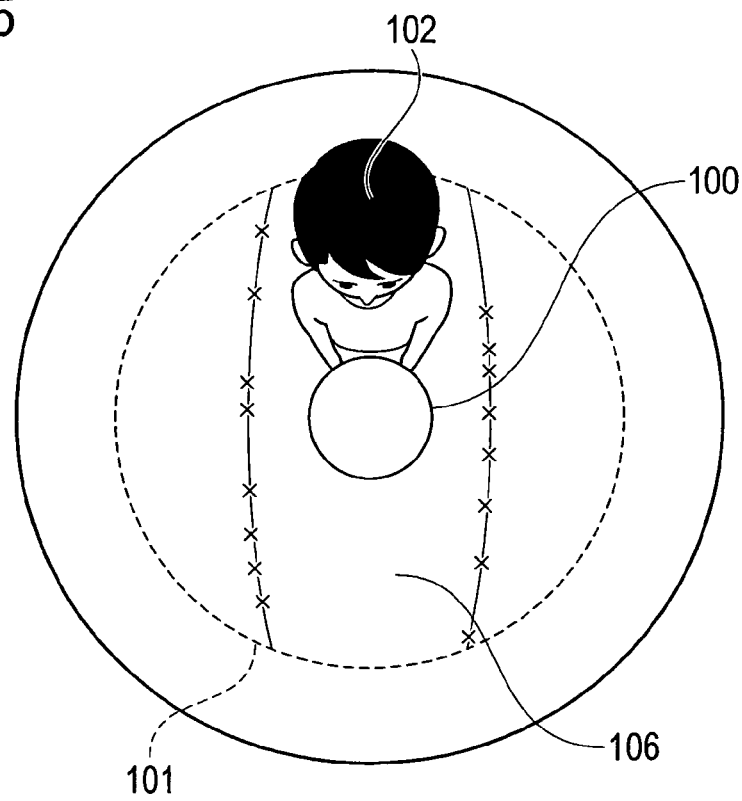
FIG. 5 is a schematic view of an image showing positions of the candidate points on the image before the coordinate conversion according to the embodiment of the present invention.
Figure 6:
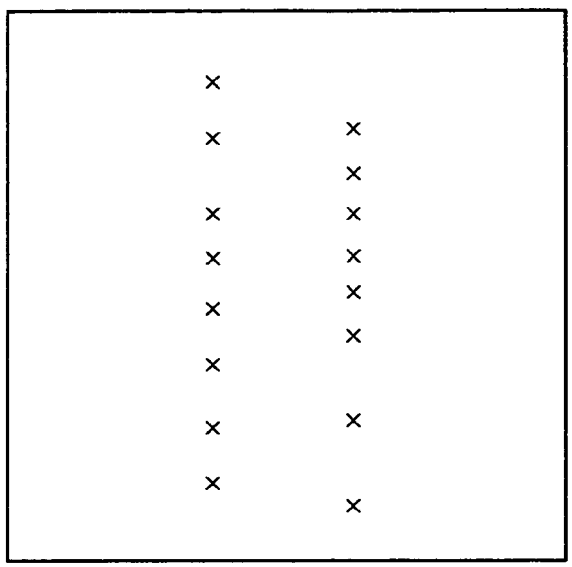
FIG. 6 is a schematic view of a bird's eye image showing positions of the candidate points on a camera coordinate after the coordinate conversion according to the embodiment of the present invention.

FIG. 5 shows an example of the image taken by the imaging device (wide angle camera) 3. In FIG. 5, only a part of the candidate points is shown by cross (x) symbols for the sake of explanation convenience. The candidate points (x symbols) detected so as to correspond to edges of a vertically extended passage 106 are expressed by distorted arrays. FIG. 6 shows an image of the bird eye's view, in which the candidate points (x symbols) on the image coordinates shown in FIG. 5 are projected on the camera coordinates by using the conversion table. On the image of the bird eye's view of FIG. 6, the distortion of the arrays of the candidate points (x symbols) corresponding to the edges of the passage 106 is decreased.

The movement control unit 16 issues a control command value to the drive device 4 so as to move the moving vehicle. Moreover, the movement control unit 16 outputs, to the difference calculation unit 14, the amount of movement from an image acquisition location at the first time to an image acquisition location at the second time. The movement amount is obtained from an encoder or the like.

The difference calculation unit 14 adds the movement amount of the moving vehicle, which is obtained from the movement control unit 16, to each positions of the candidate points at the first time, which is subjected to the coordinate conversion by the coordinate conversion unit 13, and calculates an estimated position (estimated position in the case of estimating that the candidate point is the static object) of the candidate point at the second time. The difference calculation unit 14 calculates a distance difference between an estimated positions of the candidate point on the camera coordinate at the second time and the positions of the candidate point on the camera coordinate at the second time, which is obtained by the tracking. Furthermore, the difference calculation unit 14 outputs "FALSE" in the case where "FALSE" is outputted by the coordinate conversion unit 13.

The state determination unit 15 determines each state of the respective candidate points by using the difference of each candidate point, which is calculated by the difference calculation unit 14, the state of each candidate point, which is stored in the candidate point state storage unit 25, and the position of each candidate point, which is stored in the candidate point position storage unit 22. Moreover, based on a determination result of the state of each candidate point, the state determination unit 15 dynamically changes the state of each candidate point, which is stored in the candidate point state storage unit 25, and the search threshold value $\delta_\theta$ of each direction, which is stored in the search threshold value storage unit 21.

The memory 2 includes the search threshold value storage unit 21, the candidate point position storage unit 22, the coordinate conversion table storage unit 23, a state determination threshold value storage unit 24, and the candidate point state storage unit 25.

The search threshold value storage unit 21 stores the search threshold value $\delta_\theta$ intrinsic to each direction θ where the moving vehicle has a possibility to move. The search threshold value $\delta_\theta$ of each direction, which is stored in the search threshold value storage unit 21, is changed by the state determination unit 15. When the search threshold value $\delta_\theta$ exceeds an upper limit $T_{max}$ by the change, the search threshold value $\delta_\theta$ is adjusted so as to become $T_{max}$, and when the search threshold value $\delta_\theta$ falls down below a lower limit $T_{min}$, the search threshold value $\delta_\theta$ is adjusted so as to become $T_{min}$.

In the image coordinate system, the candidate point position storage unit 22 stores the position of each candidate point detected by the candidate point detection unit 11, the time sequential position of each candidate point, which is tracked by the tracking unit 12, and the position of each candidate point, which is changed by the state determination unit 15, together with an ID of each candidate point.

The coordinate conversion table storage unit 23 stores the coordinate conversion table.

The state determination threshold value storage unit 24 stores a state determination lower limit threshold value, a state determination upper limit threshold value and the like, which are for use in determining the state of each candidate point. As the candidate point is far from the moving vehicle, an error on the coordinate conversion for the positions of the candidate point is increased, and in addition, it is not necessary to minutely know the candidate point that is far from the moving vehicle. Accordingly, the state determination lower limit threshold value and the state determination upper limit threshold value are steadily increased as the distance from the imaging device 3 to the candidate point is increased. For example, in the case where the acquired image is a wide angle image acquired by using the mirror, the state determination lower limit threshold value and the state determination upper limit threshold value make an increase shown by an upward protruding monotone increasing function as the distance from the imaging device 3 to the candidate point is increased.

The candidate point state storage unit 25 stores the state (NEW) set on the candidate point detected by the candidate point detection unit 11, and stores the state of the candidate point, which is determined by the state determination unit 15. The state stored herein can be of four types, which are: "NEW"; a state determined to be "a contact point between a static object boundary and the ground" (hereinafter, referred to as "STABLE"); a state determined to be "a contact point between a moving object boundary and the ground" (hereinafter, referred to as "DYNAMIC"); and a state determined to be "a point on an object close to the moving vehicle" (hereinafter, referred to as "NEAR").

The memory 2, for example, may be a semiconductor memory, a magnetic disk, an optical disk, a magneto-optical disk, a magnetic tape or the like. A read-only memory (ROM) and random-access memory (RAM) may be used as the semiconductor memory. The ROM stores a program executed by the CPU 1 (the details of the program are described later). The RAM serves as a temporary data memory for storing data used in executing a program by the CPU 1, and used as a working domain.

(Object Detection Method)

Figure 7:
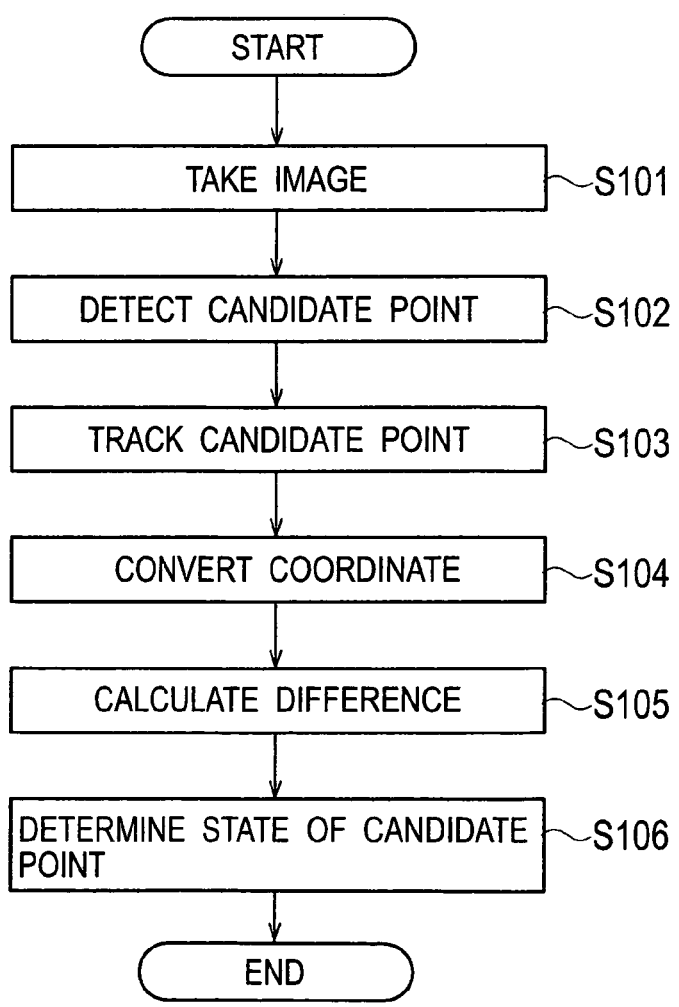
FIG. 7 is a flowchart for explaining a method for detecting an object according to the embodiment of the present invention.

Next, an example of an object detection method according to the embodiment of the present invention is described while referring to a flowchart of FIG. 7.

In Step S101, the imaging device 3 sequentially images the image as shown in FIG. 2.

In Step S102, as shown in FIG. 3, by using the search threshold value $\delta_\theta$ stored in the search threshold value storage unit 21, the candidate point detection unit 11 detects the candidate point Pθ of the contact point between the ground and the object boundary from the pixels contained in the image imaged by the imaging device 3. By using each search threshold value $\delta_\theta$ intrinsic to each direction θ, the candidate point is detected by every fixed direction θ for all the directions where the moving vehicle has a possibility to advance.

In Step S103, the tracking unit 12 tracks, in time sequence, the position of each candidate point Pθ detected by the candidate point detection unit 11, and individually calculates the position of each candidate point on the image at the first time (past) and the position of each candidate point on the image at the second time (present).

In Step S104, by using the coordinate conversion table stored in the coordinate conversion table storage unit 23, the coordinate conversion unit 13 performs the coordinate conversion for the positions of each candidate point on the image at the first and second times, which are obtained by the tracking unit 12, individually into the two-dimensional coordinates in which the candidate points are estimated to be located at the height of the ground.

In Step S105, the difference calculation unit 14 defines, as the estimated positions of the candidate point at the second time, the sum obtained by adding the movement amount of the imaging device 3 from the first time to the second time, which is obtained from the movement control unit 16, to the positions of the candidate point on the camera coordinate at the first time, which is subjected to the coordinate conversion by the coordinate conversion unit 13. Then, the difference calculation unit 14 calculates the difference between the estimated positions of the candidate point at the second time and the on-camera-coordinate positions of the candidate point at the second time, which is subjected to the coordinate conversion by the coordinate conversion unit 13.

In Step S106, the state determination unit 15 determines the state of each candidate point at the second time based on the state of the candidate point stored in the candidate point state storage unit 25 and on the difference calculated by the difference calculation unit 14. Moreover, in response to the state of each candidate at the second time, the state determination unit 15 individually changes the search threshold value $\delta_\theta$ of each direction, which is stored in the search threshold value storage unit 21, and the state of each candidate point, which is stored in the candidate point state storage unit 25.

(State Determination Processing)

Figure 8:
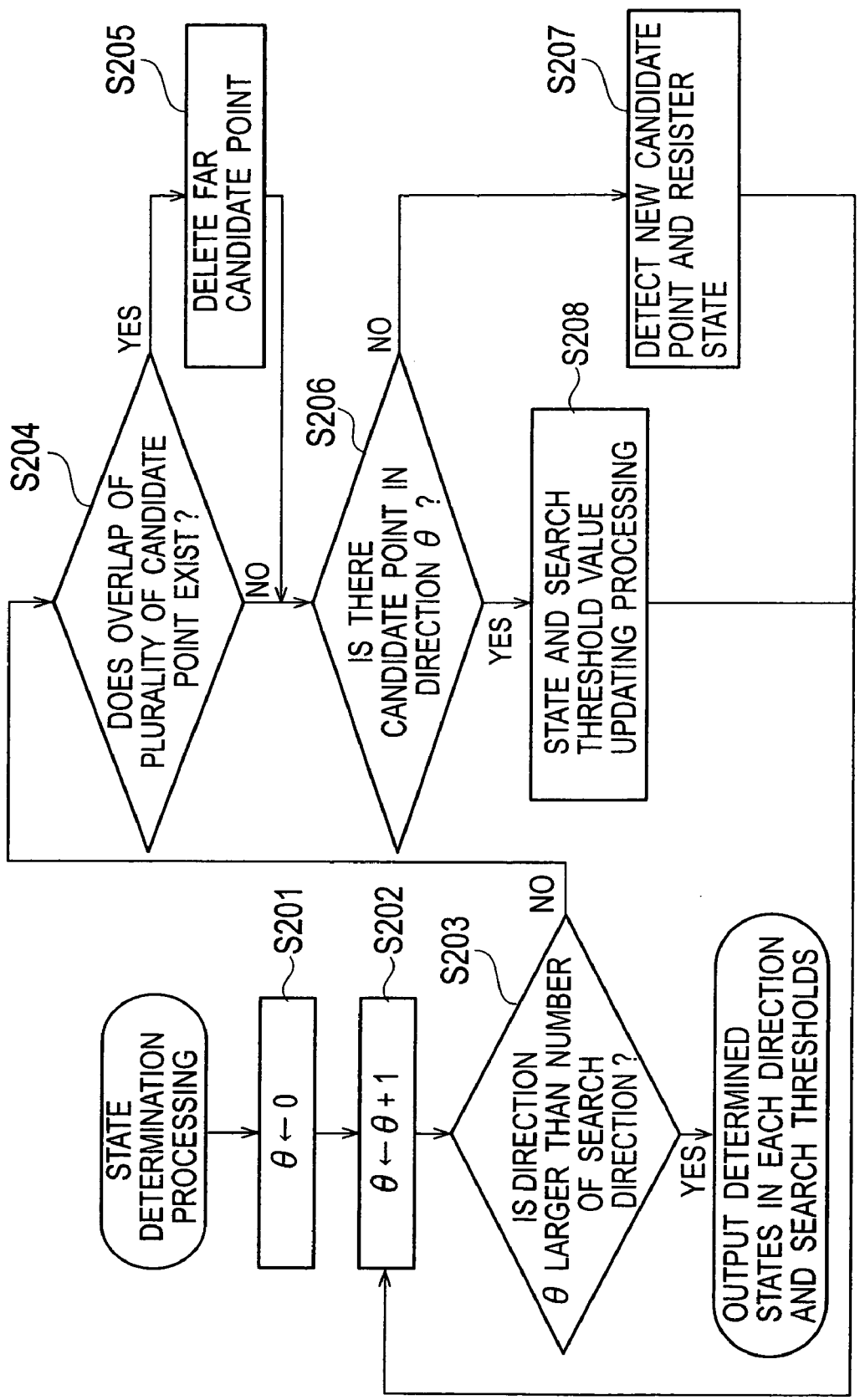
FIG. 8 is a flowchart for explaining a procedure of a state determination processing according to the embodiment of the present invention.

Next, a description is given of details of the state determination processing of Step S106 of FIG. 7 while referring to a flowchart of FIG. 8.

In Step S201, the direction θ (direction toward one end in the range where the moving vehicle has a possibility to advance) is set at 0 degree, and in Step S202, the direction θ is increased by 1 degree.

In Step S203, it is determined whether the direction θ is within the range where the moving vehicle has a possibility to advance or not. When the direction θ goes beyond a direction of the other end of the range where the moving vehicle has a possibility to advance, the processing is completed. In the case where the direction θ is within the range where the moving vehicle has a possibility to advance, the processing proceeds to Step S204.

In Step S204, the state determination unit 15 determines whether a plurality of the candidate points overlap in the same direction θ or not. It is possible that the candidate points may overlap each other because the candidate point located in the other direction previously moves to the direction θ after the tracking. In the case where the candidate point does not overlap the other candidate points in the same direction θ, the processing proceeds to Step S206. In the case where the candidate point overlap of the other candidate points in the same direction θ, then in Step S205, the candidate points distant from the imaging device 3 are cancelled, and one candidate point that is the closest to the imaging device 3 is left, and the candidate point which overlaps the closest candidate point is removed. Moreover, the search threshold values $\delta_\theta$ stored in the search threshold value storage unit 21, the states stored in the candidate point state storage unit 25, and the positions stored in the candidate point position storage unit 22, all of which correspond to the cancelled candidate points, are individually deleted.

In Step S206, the state determination unit 15 determines whether the candidate point of the direction θ exists or not. This step is performed because it is possible that the candidate point may not exist due to the fact that the candidate point of the direction θ moves to the other direction or disappears by the tracing. In the case where the candidate point exists in the direction θ, the processing proceeds to Step S208. In the case where the candidate point does not exist in the direction θ, then in Step S207, the state determination unit 15 designates the direction θ, and allows the candidate point detection unit 11 to detect a new candidate point. Then, the state determination unit 15 registers "NEW" as a state of the new candidate point in the candidate point state storage unit 25, and thereafter, registers a position of the new candidate point in the candidate point position storage unit 22. Thereafter, the processing returns to the procedure of Step S202.

In Step S208, the state determination unit 15 performs state updating processing and search threshold value updating processing for the candidate point of the direction θ. Details of the state updating processing and search threshold value updating processing will be described later. After the state updating processing and search threshold value updating processing, the processing returns to the procedure of Step S202. As a result, the state updating processing and search threshold value updating processing is performed for all the directions.

Note that, though a description has been given of the procedure of performing the determination for the overlap of the candidate points and the removal of the overlap for each direction θ in Steps S204 and S205 and performing the determination as to whether the candidate point exists or not and the detection of the new candidate point for each direction θ in Steps S206 and S207, the following procedure may be performed. Before the procedure of Step S201, the determination for the overlap of the candidate points and the removal of the overlap are performed in all the directions in a similar way to the procedures of Steps S204 and S205, and the determination as to whether the candidate point exists or not and the detection of the new candidate point are performed in all the directions in a similar way to the procedures of Steps S206 and S207, so the candidate points are set one by one in all the directions. Thereafter, the state/search threshold value updating processing is performed for each direction θ in similar procedures to those of Steps S201 to S203 and S207.

(State/Search Threshold Value Updating Processing for "NEW")

Figure 9:
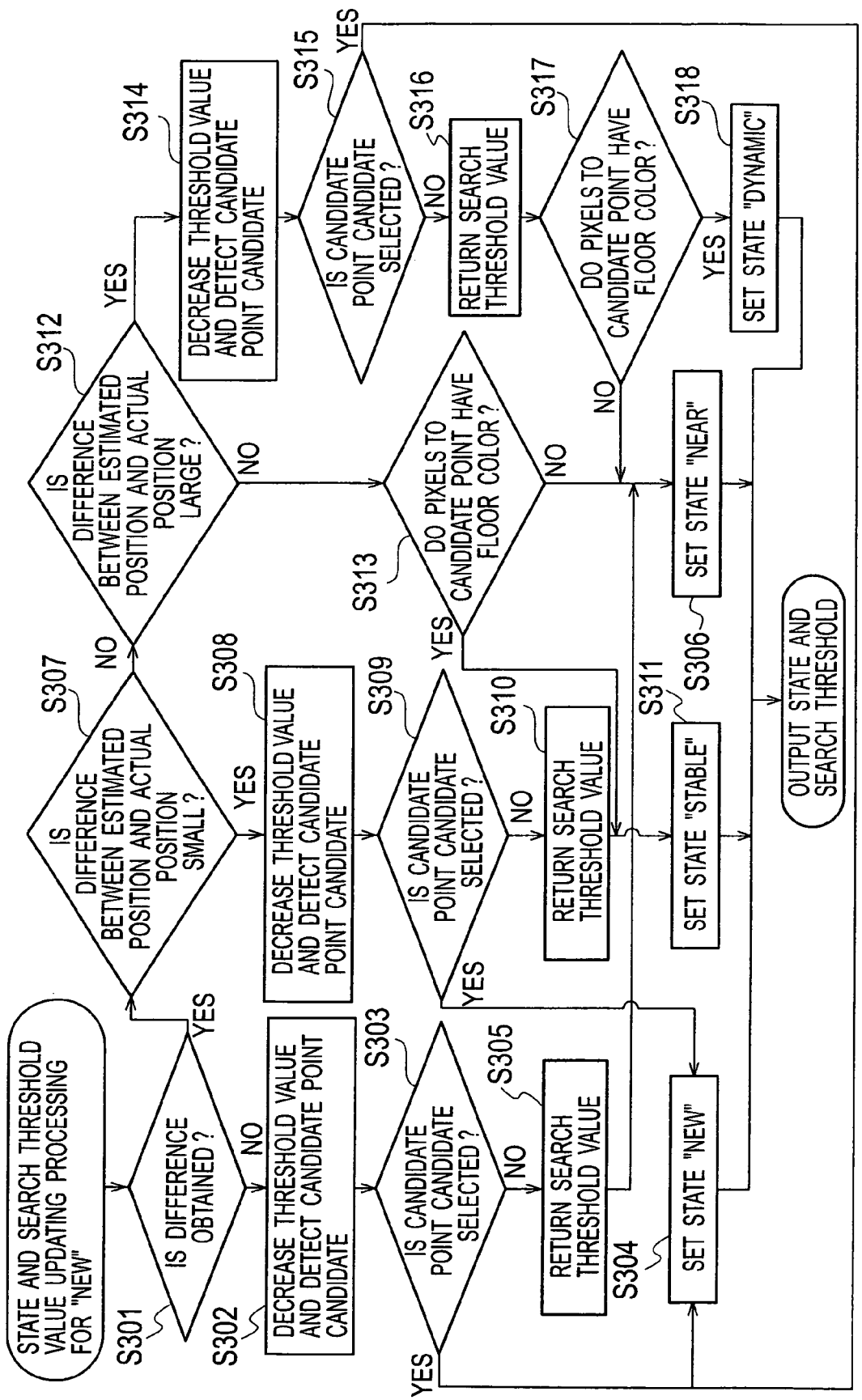
FIG. 9 is a flowchart for explaining a procedure of a state changing processing and search threshold value changing processing, in which a state of a candidate point is "NEW", according to the embodiment of the present invention.

Next, while referring to a flowchart of FIG. 9, a description is given of details of the state updating processing and search threshold value updating processing of Step S208 of FIG. 8 when the state of the candidate point, which is stored in the candidate point state storage unit 25, is "NEW". There are four types of state of the candidate point determined here, which are "NEW", "STABLE", "DYNAMIC" and "NEAR". Hereinafter, the positions of the candidate point of the direction θ on the image coordinates is defined as (r, θ), the state thereof is defined as S(θ), and the difference calculated by the difference calculation unit 14 is defined as d(θ).

In Step S301, the state determination unit 15 determines whether or not the difference d(θ) is obtained by the difference calculation unit 14. In the case where "FALSE" is output from the difference calculation unit 14, and the difference d(θ) has not been obtained, the processing proceeds to Step S302.

Figure 10:
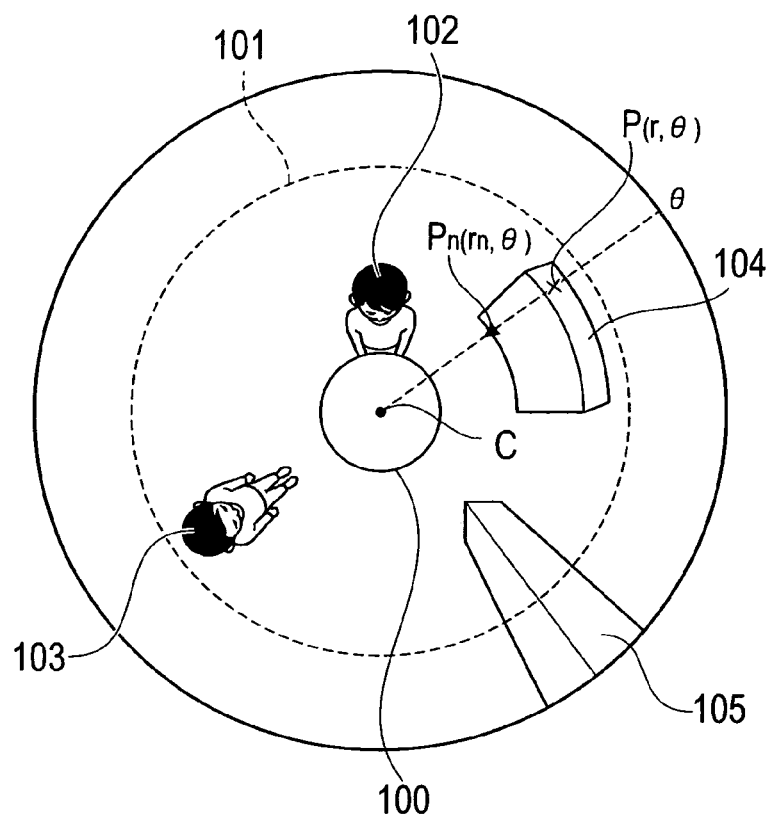
FIGS. 10 and 11 are schematic views for explaining examples of methods for detecting a candidate point candidate according to the embodiment of the present invention.

In Step S302, it is possible that the reason why the difference d(θ) has not been obtained may be due to either of the following cases. One is the case where the ground could not be detected at all since the object came close to the imaging device 3 (that is, the case where S(θ) is "NEAR"), and the other is the case where it was more preferable to update the search threshold value, and the candidate point P was detected on a distant object as shown in FIG. 10. Accordingly, the state determination unit 15 decreases the search threshold value $\delta_\theta$ of the direction θ by $\delta_s$, and registers the reduced search threshold value $\delta_\theta - \delta_s$ in the search threshold value storage unit 21. Moreover, the state determination unit 15 designates the direction θ to the candidate point detection unit 11, and allows the candidate point detection unit 11 to detect, by using the search threshold value $\delta_\theta - \delta_s$, and backward (on the center C side on the image) from the position (r, θ) of the candidate point P, a position of a pixel (hereinafter, referred to as a "candidate point candidate") $P_n$ located at the distance r of the time when the expression (1) is not satisfied in the case where the distance r is extended distantly from the center C on the image while excluding the region 100 from the search range.

In Step S303, the state determination unit 15 calculates averages of R, G and B brightness values of the pixels contained in a region from the center C of the image to the position ($r_n$, θ) of the candidate position candidate Pn except the region 100. The state determination unit 15 calculates averages of R, G and B brightness values from other candidate points already determined to be the ground, or previously obtains averages of R, G and B brightness values of a color (floor color) of the ground. Then, the averages of the R, G and B brightness values of the pixels contained in the region from the center C of the image to the position ($r_n$, θ) of the candidate position candidate Pn except the region 100 are defined as $R_n(\theta)$, $G_n(\theta)$ and $B_n(\theta)$, and the previously obtained averages of the R, G and B brightness values of the color of the ground or the averages of the R, G and B brightness values, which are obtained from the candidate points already determined to be the ground are defined as $R_r(\theta)$, $G_r(\theta)$ and $B_r(\theta)$. Thereafter, a final determination for S(θ) is performed by using an expression (5).

$$(R_r(\theta)-R_n(\theta))^2+(G_r(\theta)-G_n(\theta))^2+(B_r(\theta)-B_n(\theta))^2<\delta_{RGB} \qquad (5)$$

A threshold value $\delta_{RGB}$ is stored, for example, in the state determination threshold value storage unit 24. In the case where the expression (5) is satisfied, this case is estimated to be the case where it is more preferable to update the search threshold value, and the candidate point is detected on the distant object. Accordingly, the position ($r_n$, θ) of the candidate point candidate Pn is selected as a new candidate point, and is registered in the candidate point position storage unit 22. In Step S304, the state determination unit 15 registers "NEW" as S(θ) in the candidate point state storage unit 25. Meanwhile, in the case where the expression (5) is not satisfied in Step S303, the state determination unit 15 selects the original candidate point P. In Step S305, the state determination unit 15 returns the search threshold value $\delta_\theta - \delta_s$ of the direction θ, which is stored in the search threshold value storage unit 21, to the original search threshold value $\delta_\theta$. In Step S306, the state determination unit 15 registers "NEAR" as S(θ) in the candidate point state storage unit 25.

In the case where the difference d(θ) is obtained in Step S301, the processing proceeds to Step S307. In Step S307, by using an expression (6), the state determination unit 15 determines whether or not the difference d(θ) is smaller than a state determination lower limit threshold value $\delta_1(r)$.

$$d(\theta) < \delta_1(r) \quad (6)$$

In the case where the expression (6) is satisfied, the processing proceeds to Step S308.

Figure 11:
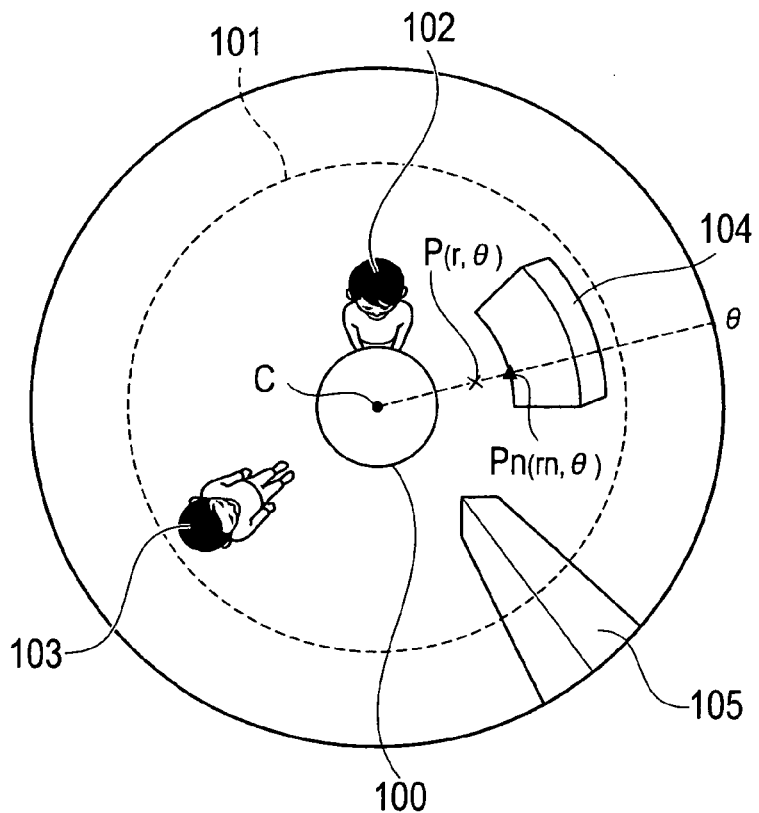

In Step S308, since the difference d(θ) is small, it is highly probable that S(θ) will become "STABLE". However, as shown in FIG. 11, due to reflection of illumination light and to a pattern of the ground, it is possible that the candidate point may be detected at a place closer to the center C than the contact point between the object and the ground. Accordingly, the state determination unit 15 designates the direction θ, and allows the candidate point detection unit 11 to detect the candidate point candidate Pn more distantly than the position (r, θ) of the candidate point P by using the search threshold value $\delta_\theta$. At this time, in order to make the search more distantly, the search threshold value $\delta_\theta$ is increased by $\delta_s$, the increased search threshold value $\delta_\theta + \delta_s$ is registered in the search threshold value storage unit 21, and the search threshold value $\delta_\theta + \delta_s$ registered is used.

Figure 12:
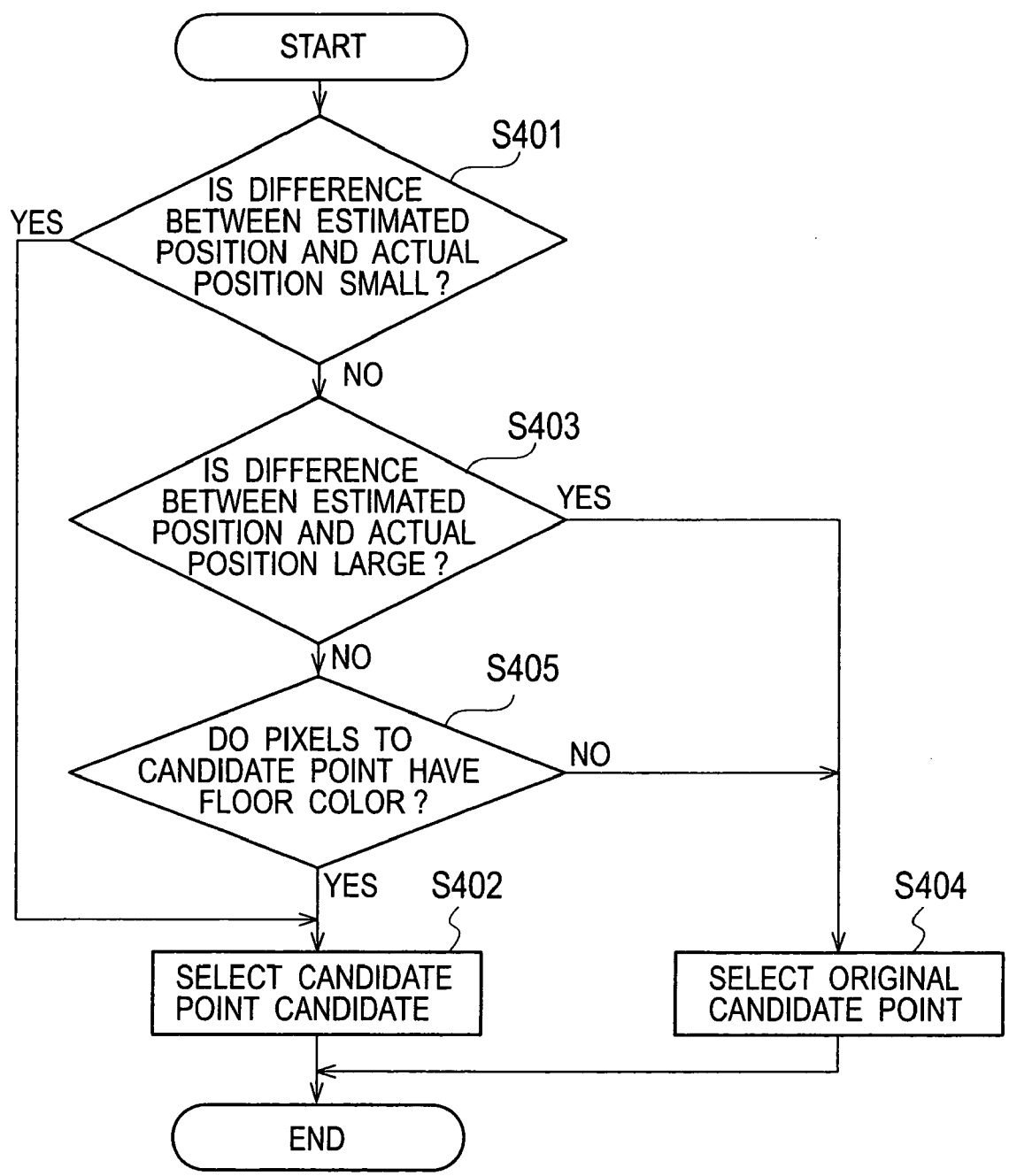
FIG. 12 is a flowchart for explaining a procedure of a determination processing of the candidate point candidate according to the embodiment of the present invention.

In Step S309, it is determined whether or not to select the candidate point candidate Pn by a procedure of a flowchart of FIG. 12. Specifically, in Step S401 of FIG. 12, the tracking unit 12 tracks the position $(r_n, \theta)$ of the candidate point candidate Pn at the second time reversely (to the past) to the time sequence, and calculates an positions of the candidate point candidate Pn on the image at the first time. The coordinate conversion unit 13 performs the coordinate conversion individually for positions of the candidate point candidate Pn on the image at the first time and positions of the candidate point candidate Pn on the image at the second time. The difference calculation unit 14 adds the movement (amount of movement) of the moving vehicle, which is obtained from the movement control unit 16, to the positions of the candidate point candidate Pn on the camera coordinate at the first time, which is subjected to the coordinate conversion, and calculates an estimated positions of the candidate point candidate Pn at the second time. The difference calculation unit 14 calculates a distance difference $d_n(\theta)$ between the estimated positions of the candidate point candidate Pn at the second time and the positions of the candidate point candidate Pn on the camera coordinate at the second time. By using the expression (6), the state determination unit 15 determines whether or not the difference $d_n(\theta)$ is smaller than the state determination lower limit threshold value $\delta_1$ (r). In the case where the candidate point candidate Pn satisfies the expression (6), the position $(r_n, \theta)$ of the candidate point candidate Pn is the ground (floor), and it is estimated that the floor is spread more distantly than the original candidate point P, and that the candidate point candidate Pn and the original candidate point P are also points on the ground (floor). Hence, in Step S402, the state determination unit 15 selects the candidate point candidate Pn estimated to be closer to a distant floor side as a new candidate point, and resisters the position $(r_n, \theta)$ of the candidate point candidate Pn in the candidate point position storage unit 22. Meanwhile, in the case where the candidate point candidate Pn does not satisfy the expression (6), the processing proceeds to Step S403.

In Step S403, by using an expression (7), the state determination unit 15 determines whether or not the difference $d_n(\theta)$ is larger than a state determination upper limit threshold value $\delta_u(r)$.

$$d_n(\theta) > \delta_u(r) \quad (7)$$

When the difference $d_n(\theta)$ satisfies the expression (7), it is highly possible that the candidate point candidate Pn isn't the on-ground point but an on-object point, and it is estimated that the object exists forward of the original candidate point P. Hence, in Step S404, the state determination unit 15 selects the original candidate point P, and reregisters the position of the original candidate point P (r, θ) in the candidate point position storage unit 22. When the difference $d_n(\theta)$ does not satisfy the expression (7), the processing proceeds to Step S405.

In Step S405, the averages of the R, G and B brightness values of the pixels contained in the region from the center C of the image to the position $(r_n, \theta)$ of the candidate position candidate Pn except the region 100 are defined as $R_n(\theta)$, $G_n(\theta)$ and $B_n(\theta)$, and averages of R, G and B brightness values of pixels contained in a region from the position $(r_n, \theta)$ of the candidate point candidate Pn to the position (r, θ) of the candidate point P are defined as $R_r(\theta)$, $G_r(\theta)$ and $B_r(\theta)$. Thereafter, it is determined whether or not the expression (5) is satisfied. In the case where the expression (5) is satisfied, it is estimated that the candidate point candidate Pn is the on-ground point. Accordingly, the state determination unit 15 selects the candidate point candidate Pn, and registers "NEW" in the candidate point state storage unit 25 in Step S304 of FIG. 9. In the case where the expression (5) is not satisfied, it is estimated that the candidate point candidate Pn is not the on-ground point. Accordingly, the state determination unit 15 selects the original candidate point P, and returns the search threshold value $\delta_\theta + \delta_s$ of the direction θ, which is stored in the search threshold value storage unit 21, to the original search threshold value $\delta_\theta$ in Step S310 of FIG. 9. In Step S311, the state determination unit 15 registers "STABLE" as S(θ) in the candidate point state storage unit 25.

In the case where the expression (6) is not satisfied in Step S307, the processing proceeds to Step S312. In Step S312, by using the expression (7), the state determination unit 15 determines whether or not the difference $d_n(\theta)$ is larger than the state determination upper limit threshold value $\delta_u(r)$. In the case where the expression (7) is satisfied, the difference $d_n(\theta)$ is larger. Accordingly, it is possible that the ground cannot be detected (that S(θ) is "NEAR") since the object comes close to the moving vehicle and the imaging device 3, that the object may move from the estimated position thereof (that S(θ) is "DYNAMIC") since the object is the moving object, or that it may be more preferable to update the search threshold value, and the candidate point may be detected on the distant object. In Step S314, the state determination unit 15 decreases the search threshold value $\delta_\theta$ of the direction θ by $\delta_s$, and registers the decreased search threshold value $\delta_\theta - \delta_s$ in the search threshold value storage unit 21. By using the registered search threshold value $\delta_\theta - \delta_s$, the candidate point detection unit 11 detects the position $(r_n, \theta)$ of the candidate point candidate Pn on the center C side from the position (r, θ) of the candidate point P.

In Step S315, the state determination unit 15 defines, as $R_n(\theta)$, $G_n(\theta)$ and $B_n(\theta)$, the averages of the R, G and B brightness values of the pixels contained in the region from the center C of the image to the position $(r_n, \theta)$ of the candidate position candidate Pn except the region 100, and defines, as $R_r(\theta)$, $G_r(\theta)$ and $B_r(\theta)$, the averages of R, G and B brightness values of the pixels contained in the region from the position $(r_n, \theta)$ of the candidate point candidate Pn to the position (r, θ) of the candidate point P, and thereafter, makes the final determination for S(θ) by using the expression (5). In the case where the expression (5) is not satisfied, this case is estimated to be the case where it is more preferable to update the search threshold value. Accordingly, in Step S304, the state determination unit 15 selects the candidate point candidate Pn as the new candidate point, registers "NEW" as S(θ) in the candidate point state storage unit 25, and registers the position ($r_n$, θ) of the candidate point candidate Pn in the candidate point position storage unit 22. When the expression (5) is satisfied in Step S315, the state determination unit 15 estimates that S(θ) is "NEAR" or "DYNAMIC". The state determination unit 15 selects the original candidate point P, and in Step S316, returns the search threshold value $δ_θ−δ_s$ of the direction θ, which is stored in the search threshold value storage unit 21, to the original search threshold value $δ_θ$.

In Step S317, the state determination unit 15 defines, as $R_r(θ)$, $G_r(θ)$ and $B_r(θ)$, the averages of the R, G and B brightness values of the pixels contained in the region from the center C of the image to the position ($r_n$, θ) of the candidate position P except the region 100, and defines, as $R_n(θ)$, $G_n(θ)$ and $B_n(θ)$, the previously obtained averages of the color of the ground or the averages of the R, G and B brightness values, which are obtained when the points already determined to be the ground are calculated, and thereafter, makes the final determination for S(θ) by using the expression (5). In the case where the expression (5) is satisfied, it is estimated that the region to the position (r, θ) of the candidate point P is the ground, and that the object is the moving object. Accordingly, in Step S318, the state determination unit 15 registers "DYNAMIC" as S(θ) in the candidate point state storage unit 25. When the expression (5) is not satisfied, it is estimated that the ground cannot be detected since the object comes close to the moving vehicle and the imaging device 3. Accordingly, in Step S306, the state determination unit 15 registers "NEAR" as S(θ) in the candidate point state storage unit 25.

In the case where the expression (7) is not satisfied in Step S312, the processing proceeds to Step S313. In Step S313, the state determination unit 15 defines, as $R_r(θ)$, $G_r(θ)$ and $B_r(θ)$, the averages of the R, G and B brightness values of the pixels contained in the region from the center C of the image to the position (r, θ) of the candidate position P except the region 100, and defines, as $R_n(θ)$, $G_n(θ)$ and $B_n(θ)$, the previously obtained averages of the R, G and B brightness values of the color of the ground or the averages of the R, G and B brightness values, which are obtained from the candidate points already determined to the ground, and thereafter, makes the final determination for S(θ) by using the expression (5). In the case where the expression (5) is satisfied, the processing proceeds to Step S311, and the state determination unit 15 registers "STABLE" as S(θ) in the candidate point state storage unit 25. Meanwhile, in the case where the expression (5) is not satisfied, the processing proceeds to Step S306, and the state determination unit 15 registers "NEAR" as S(θ) in the candidate point state storage unit 25.

(State/Search Threshold Value Updating Processing)

Figure 13:
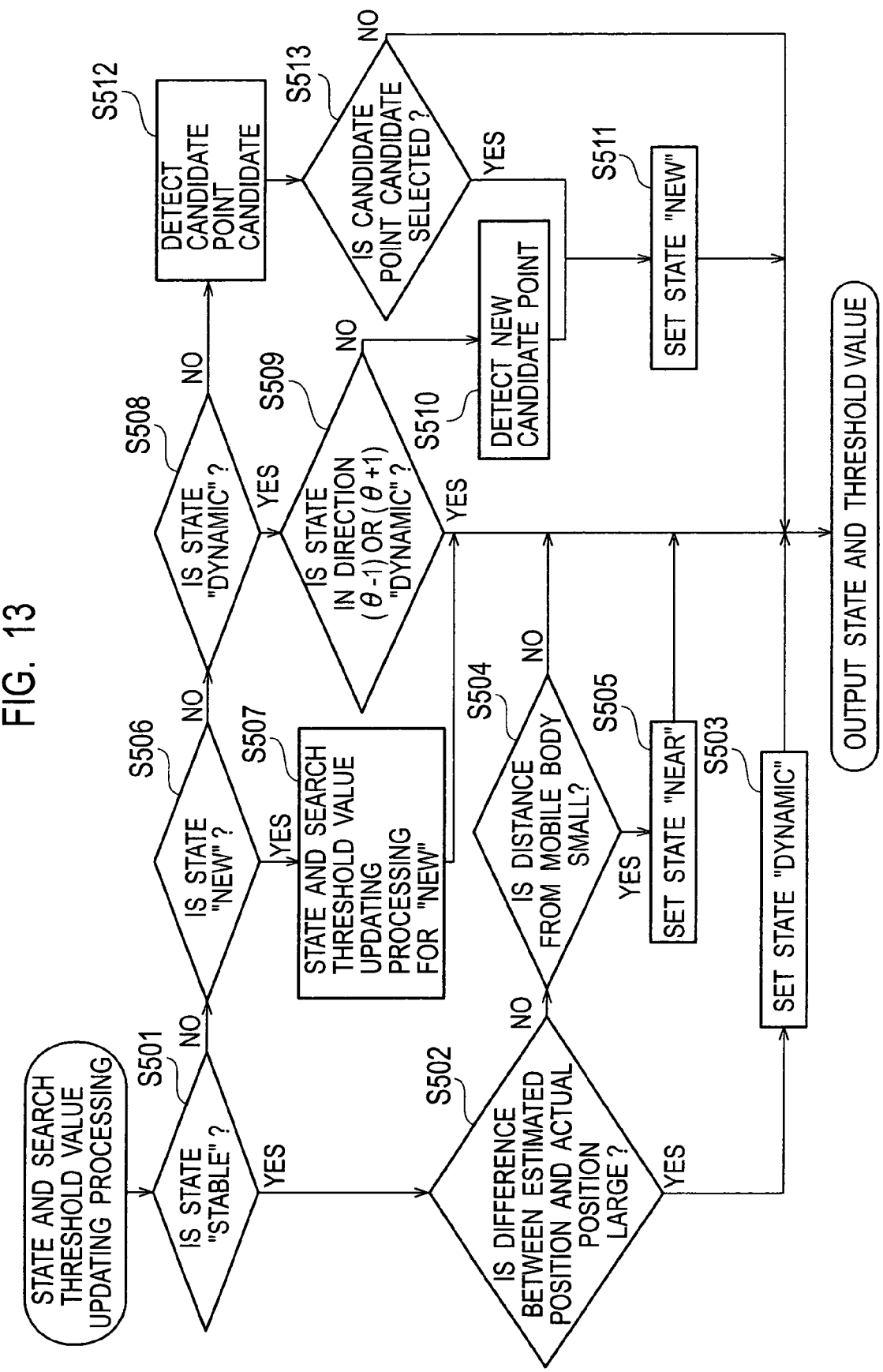
FIG. 13 is a flowchart for explaining a procedure of a changing processing of a state and a search threshold value according to the embodiment of the present invention.

Next, while referring to a flowchart of FIG. 13, a description is given of details of the case where S(θ) stored in the candidate point state storage unit 25 is either "NEW", "STABLE", "DYNAMIC" or "NEAR" in the state updating processing and search threshold value updating processing of Step S208 of FIG. 8.

In Step S501, the state determination unit 15 determines whether or not S(θ) stored in the candidate point state storage unit 25 is "STABLE". In the case where S(θ) is "STABLE", the processing proceeds to Step S502.

In Step S502, though it is possible that S(θ) may be "STABLE", it is also possible that the moving object may not be moving by accident. Accordingly, by using the expression (7), the state determination unit 15 determines whether or not d(θ) is larger than the state determination upper limit threshold value $δ_u(r)$. In the case where the expression (7) is satisfied, it is estimated to that the moving object has not moved by accident. In Step S503, the state determination unit 15 registers "DYNAMIC" as S(θ) in the candidate point state storage unit 25. Meanwhile, in the case where the expression (7) is not satisfied in Step S502, the processing proceeds to Step S504.

In Step S504, though it is possible that S(θ) may be "STABLE", it is also possible that S(θ) may be "NEAR" due to the movement of the moving vehicle or the imaging device 3. Accordingly, the state determination unit 15 compares the threshold value stored in the state determination threshold value storage unit 24 and the distance from the moving vehicle to the candidate point P with each other, and determines whether or not the distance between the candidate point P and the moving vehicle is smaller than the threshold value. When the distance between the candidate point and the moving vehicle is smaller than the threshold value, then in Step S505, the state determination unit 15 registers "NEAR" as S(θ) in the candidate point state storage unit 25. When the distance between the candidate point and the moving vehicle is equal to or larger than the threshold value, the state determination unit 15 maintains "STABLE" registered in the candidate point state storage unit 25.

In the case where S(θ) stored in the candidate point state storage unit 25 in Step S501 is other than "STABLE", the processing proceeds to Step S506. In Step S506, the state determination unit 15 determines whether or not S(θ) is "NEW". In the case where S(θ) is "NEW", the state determination unit 15 performs the state updating processing and search threshold value updating processing of the time when S(θ) is "NEW" in Step S507. This state updating processing and search threshold value updating processing of the time when S(θ) is "NEW" is substantially similar to that in the procedure of the flowchart of FIG. 9, and accordingly, a duplicate description is omitted.

In the case where S(θ) stored in the candidate point state storage unit 25 is not "NEW" in Step S506, the processing proceeds to Step S508. In Step S508, the state determination unit 15 determines whether or not S(θ) is "DYNAMIC". In the case where S(θ) is "DYNAMIC", the processing proceeds to Step S509.

Figure 14:
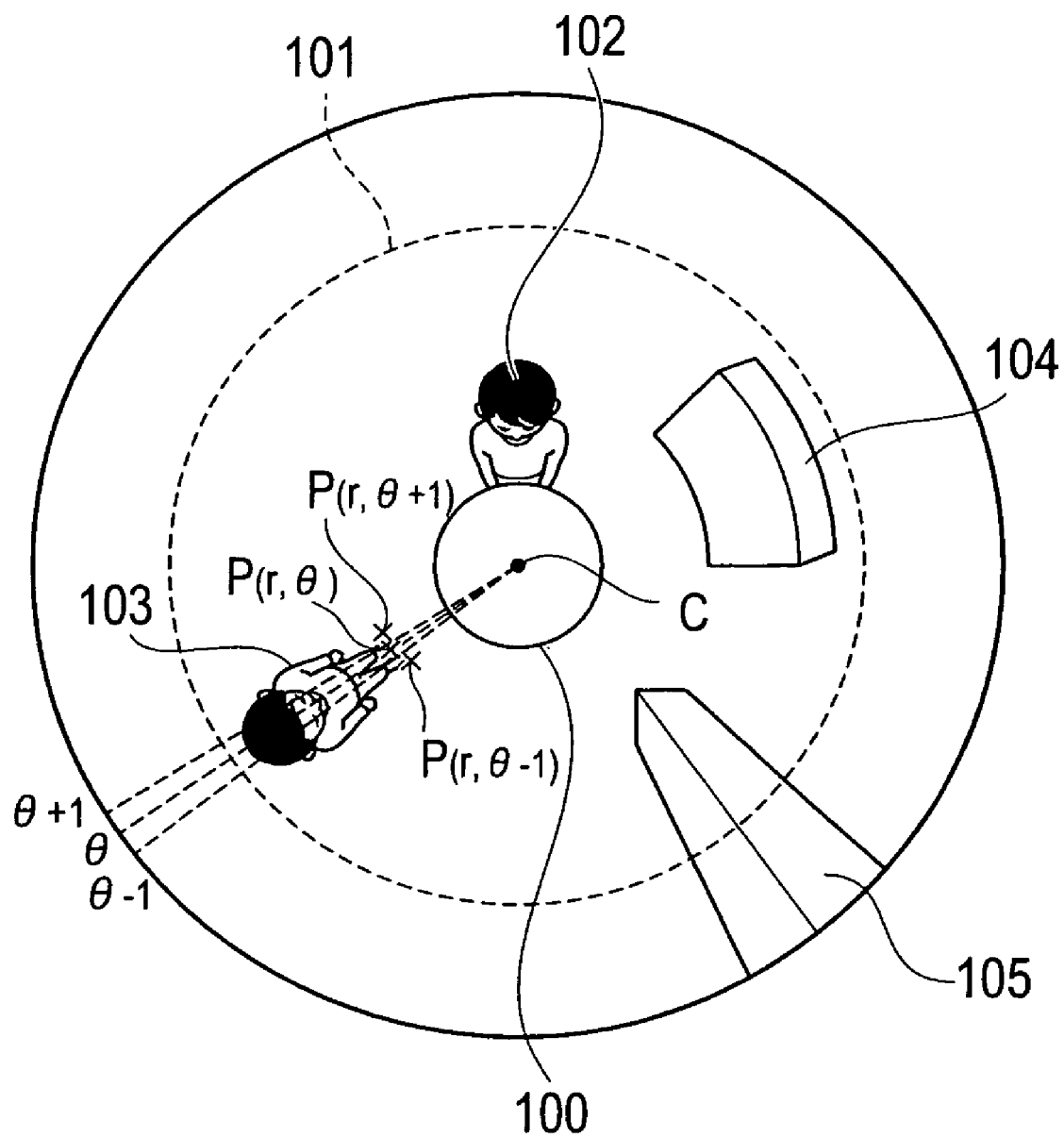
FIG. 14 is a schematic view for explaining an example of a state determination processing according to the embodiment of the present invention.

In Step S509, though it is possible that S(θ) may be "DYNAMIC" as shown in FIG. 14, it is also possible that S(θ) may be noise. Accordingly, the state determination unit 15 determines whether or not either of states S(θ+D) and S(θ−D) of the respective candidate points P(r, θ−1) and P(r, θ+1) of directions θ−1 and θ+1 adjacent to the direction θ on both sides is "DYNAMIC". In the case where any of S(θ+D) and S(θ−D) is not "DYNAMIC", it is estimated that S(θ) is the noise. Accordingly, in Step S510, the state determination unit 15 designates the direction θ, allows the candidate point detection unit 11 to detect the new candidate point, and registers the position of the new candidate point in the candidate point position storage unit 22. In Step S511, the state determination unit 15 registers "NEW" as S(θ) in the candidate point state storage unit 25. Meanwhile, in the case where either of S(θ+D) and S(θ−D) is "DYNAMIC" in Step S509, the state determination unit 15 maintains S(θ) stored in the candidate point state storage unit 25 to be "DYNAMIC".

In the case where S(θ) stored in the candidate point state storage unit 25 is not "DYNAMIC" in Step S508, the processing proceeds to Step S512. In Step S512, though it is highly probable that S(θ) may be "NEAR", it is also probable that S(θ) may not be "NEAR" owing to the movement of the moving vehicle and the moving object. Accordingly, in Step S512, the state determination unit 15 designates the direction θ, and allows the candidate point detection unit 11 to detect the candidate point candidate Pn. Here, in order to investigate whether or not S(θ) keeps on being "NEAR", the search threshold value $\delta_\theta$ is used as it is without being increased or decreased, and the candidate point candidate Pn is searched thereby. As a result, the candidate point candidate Pn is detected at substantially the same position as the position (r, θ) of the original candidate point P.

In Step S513, the state determination unit 15 defines, as $R_n(\theta)$, $G_n(\theta)$ and $B_n(\theta)$, the averages of the R, G and B brightness values of the pixels contained in the region from the center C of the image to the position ($r_n$, θ) of the candidate position candidate Pn except the region 100, and defines, as $R_r(\theta)$, $G_r(\theta)$ and $B_r(\theta)$, the averages of R, G and B brightness values of the pixels contained in the region from the position ($r_n$, θ) of the candidate point candidate Pn to the position (r, θ) of the candidate point P, and thereafter, determines whether or not the expression (5) is satisfied. In the case where the expression (5) is satisfied, the color of the region from the center C of the image to the candidate point candidate Pn and the color of the region from the original candidate point P to the candidate point candidate Pn are similar to each other. Accordingly, the state determination unit 15 finally determines that S(θ) is "NEAR", and maintains "NEAR" stored in the candidate point state storage unit 25. Meanwhile, the case where the expression (5) is not satisfied and the colors differ from each other is considered to be any one of two cases. One is the case where the object that has been "NEAR" up to now moves, whereby the ground (floor) is visible between the object and the center C, a color of the region from the center C to the candidate point candidate Pn is the floor color, and the color of the region from the candidate point candidate Pn to the original candidate point P is the color of the object that has been "NEAR" up to this time. Another is the case where the object that has been "NEAR" up to now further approaches to the center C, the ground (floor) looks like changing the color. In either cases, the point in which the change of color is radical (that is, the candidate point candidate Pn located at the place where the color change exceeds the threshold value) is easier to be tracked. Accordingly, in the case where the expression (5) is not satisfied, the candidate point candidate Pn is selected for S(θ), and the determination as to whether the object remains to be "NEAR" is delegated to the latter-stage processing. The state determination unit 15 registers "NEW" as S(θ) in the candidate point state storage unit 25, and registers the position ($r_n$, θ) of the candidate point candidate Pn in the candidate point position storage unit 22.

As described above, in accordance with the embodiment of the present invention, the method of estimating the candidate point, in which a floor surface side line is traceable, is not used, but it is determined whether or not the candidate point is actually the contact point between the ground and the object boundary. Accordingly, even in the case where the moving object exists, the sensor for measuring the distance is not used besides the one imaging device 3, and the object can be detected by only the imaging device 3.

The position of the tracked candidate point on the camera coordinate and the estimated positions of the candidate point, which is obtained by using the movement amount of the moving vehicle, are compared with each other. Thus, it can be determined whether the candidate point is the contact point between the static object boundary and the ground (floor) or the contact point between the moving object boundary and the ground (floor). Hence, even if the moving object exists, the virtual images of the object can be eliminated, it can be determined whether the object is the moving object or the static object, and the avoidance operation corresponding to a result of the identification can be performed.

(Object Detection Program)

A series of the procedures shown in FIGS. 7 to 9, 12 and 13 can be achieved by controlling the object detection apparatus shown in FIG. 1 with a program having algorisms equivalent to that of FIGS. 7 to 9, 12 and 13. The program may be stored in the memory 2 and the like. The program can be stored in a computer-readable storage medium. The procedures of the method according to the embodiment of the present invention can be performed by reading the program from the computer-readable storage medium to the data memory 2.

Here, the "computer-readable storage medium" refers to any media that can store a program, including, e.g., external memory units, semiconductor memories, magnetic disks, optical disks, magneto-optical disks, magnetic tape, and the like for a computer. To be more specific, the "computer-readable storage media" include flexible disks, CD-ROMs, MO disks, cassette tape, open reel tape, and the like. For example, the main body of the mask data generation system can be configured to incorporate a flexible disk drive and an optical disk drive, or to be externally connected thereto.

A flexible disk is inserted into the flexible disk drive from a slot, a CD-ROM is inserted into the optical disk drive from a slot, and then a given readout operation is executed, whereby programs stored in these storage media can be installed in the memory 2. In addition, by connecting given drives to the mask data generation system, it is also possible to use, for example, a ROM as a memory unit employed for a game pack or the like, and cassette tape as magnetic tape. Furthermore, it is possible to store a program in the memory 2 via an information processing network, such as the Internet.

Other Embodiment

Various modifications will become possible for those skilled in the art after receiving the teachings of the present disclosure without departing from the scope thereof.

In the expression (6) and the expression (7), the state determination lower limit threshold value $\delta_l(r)$ and the state determination upper limit threshold value $\delta_u(r)$ are used, respectively. However, the state determination lower limit threshold value $\delta_l(r)$ and the state determination upper limit threshold value $\delta_u(r)$ may be the same value.

In the procedures of Steps S303, S309, S313, S315 and S317 of FIG. 9 and Step S513 of FIG. 13, the final determinations are performed by using the RGB color information and the expression (5). However, the final determinations may be performed by using reverse tracking in place of using the RGB color information, or the final determinations may be performed by using color information of other than RGB. Moreover, a method using not only the simple comparison as in the expression (5) but also a probability distribution such as Gaussian Mixture Model can be used.

The description has been made of the case of determining the state of the candidate point at the first and second times; however, it is a matter of course that the state determination processing for the candidate point may be performed dynamically along the time sequence.

What is claimed is:
1. An apparatus for detecting an object, comprising:
 a candidate point detection unit configured to detect a candidate point of a contact point between the ground and an object located on the ground from pixels in an image of the object taken by an imaging device;
 a search threshold value storage unit configured to store a search threshold value for use in detecting the candidate point;

a tracking unit configured to track positions of the candidate point, and calculate the positions of the candidate point at a first time and a second time, respectively;

a difference calculation unit configured to calculate a difference between an estimated position of the candidate point at the second time, the estimated position being estimated based on the position of the candidate point at the first time, and the position of the candidate point at the second time;

a candidate point state storage unit configured to store a state of the candidate point; and a state determination unit configured to determine a new state of the candidate point at the second time based on the difference, and change the search threshold value stored in the search threshold value storage unit or the state stored in the candidate point state storage unit, in accordance with the new state.

2. The apparatus of claim 1, wherein the candidate point detection unit calculates a brightness difference between adjacent pixels from a first side of the imaging device to a second side of the image device, and searches for a pixel having a brightness difference larger than the search threshold value, from the first side of the imaging device to the second side of the imaging device.

3. The apparatus of claim 1, further comprising:
a coordinate conversion unit configured to convert a coordinate of the positions of the candidate point at the first and the second time individually into two-dimensional coordinates in which the candidate points are estimated to be located at a height of the ground; and a coordinate conversion table storage unit configured to store a coordinate conversion table showing a correspondence relationship between coordinates on the image and the two-dimensional coordinates.

4. The apparatus of claim 3, wherein
the difference calculation unit calculates the estimated position by adding an amount of movement of the imaging device between the first time and the second time to the candidate point at the first time after the coordinate conversion.

5. The apparatus of claim 1, wherein the state determination unit cancels at least one of the candidate points distant from the imaging device when an overlap of a plurality of the candidate points exists in the same direction at the second time.

6. The apparatus of claim 1, further comprising:
a state determination threshold value storage unit configured to store a state determination upper limit threshold value and a state determination lower limit threshold value for determining the state, and wherein the state determination unit determines the candidate point as the contact point between the boundary of a static object and the ground when the difference is smaller than the state determination lower limit threshold value, and the state determination unit determines the candidate point as the contact point between the boundary of a moving object and the ground when the difference is larger than the state determination upper limit threshold value.

7. The apparatus of claim 6, wherein the state determination lower limit threshold value and the state determination upper limit threshold value are increased as the distance from the imaging device to the candidate point is increased.

8. The apparatus of claim 6, wherein the state determination unit detects a candidate point candidate distant from the candidate point when the difference is smaller than the state determination lower limit threshold value, the state determination unit determines whether the candidate point candidate is the contact point between the boundary of a static object and the ground using color information of the ground, and the state determination unit cancels the candidate point and determines the candidate point candidate as a new candidate point when the candidate point candidate is determined as the contact point between the boundary of the static object and the ground.

9. The apparatus of claim 8, wherein the state determination unit tracks the position of the candidate point candidate at the second time, and calculates the position the candidate point candidate at the first time, and the state determination unit determines a state of the candidate point candidate by comparing a distance from the position of the candidate point candidate at the first time to the position of the candidate point candidate at the second time with an amount of movement of the imaging device from the first time to the second time.

10. The apparatus of claim 6, wherein the state determination unit increases the search threshold value when the difference is smaller than the state determination lower limit threshold value; and the state determination unit decreases the search threshold value when the difference is larger than the state determination upper limit threshold value.

11. The apparatus of claim 1, wherein the state determination unit detects a candidate point candidate at a side of the imaging device from the candidate point when the difference is larger than the state determination upper limit threshold value; and the state determination unit determines a state of the candidate point candidate using color information of the ground.

12. A method for detecting an object, comprising:
reading a search threshold value from a search threshold value storage unit, and detecting a candidate point of a contact point between the ground and a boundary of an object located on the ground from pixels in an image of the object taken by an imaging device based on the search threshold value;

tracking a position of the candidate point, and calculating the positions at a first time and a second time, respectively;

calculating a difference between an estimated position at the second time, the estimated position being estimated based on the position of the candidate point at the first time, and the position of the candidate point at the second time;

determining a new state of the candidate point at the second time based on the difference; and changing the search threshold value stored in the search threshold value storage unit or a state of the candidate point stored in a candidate point state storage unit, in accordance with the new state.

13. The method of claim 12, wherein detecting the candidate point comprises:
calculating a brightness difference between adjacent pixels from a first side of the imaging device to a second side of the imaging device; and searching for a pixel having a brightness difference larger than the search threshold value, from the first side of the imaging device to the second side of the imaging device.

14. The method of claim 12, further comprising:
converting a coordinate of the position of the candidate point at the first and second time individually into two-dimensional coordinates in which the candidate points are estimated to be located at a height of the ground.

15. The method of claim 14, wherein calculating the difference comprises:
calculating the estimated position by adding an amount of movement of the imaging device between the first time and the second time to the candidate point at the first time after the coordinate conversion.

16. The method of claim 12, further comprising:
canceling at least one of a plurality of the candidate points distant from the imaging device when an overlap of a plurality of the candidate points exists in the same direction at the second time.

17. The method of claim 12, wherein determining the new state of the candidate point comprises:
determining the candidate point as the contact point between the boundary of a static object and the ground when the difference is smaller than a state determination lower limit threshold value; and
determining the candidate point as the contact point between the boundary of a moving object and the ground when the difference is larger than a state determination upper limit threshold value.

18. The method of claim 17, wherein the state determination lower limit threshold value and the state determination upper limit threshold value are increased as the distance from the imaging device to the candidate point is being increased.

19. The method of claim 17, wherein determining the new state of the candidate point comprises:
detecting a candidate point candidate distant from the candidate point when the difference is smaller than the state determination lower limit threshold value;
determining whether the candidate point candidate is the contact point between the boundary of a static object and the ground using color information of the ground; and
canceling the candidate point and determining the candidate point candidate as a new candidate point when the candidate point candidate is determined as the contact point between the boundary of the static object and the ground.

20. The method of claim 19, wherein determining the new state of the candidate point comprises:
tracking the position of the candidate point candidate at the second time, and calculating the position of the candidate point candidate at the first time; and
determining a state of the candidate point candidate by comparing a distance from the position of the candidate point candidate at the first time to the position of the candidate point candidate at the second time with a movement amount of the imaging device between the first time and the second time.

* * * * *